United States Patent
Ashdown

(10) Patent No.: US 8,977,371 B2
(45) Date of Patent: Mar. 10, 2015

(54) LIGHTING CONTROL SYSTEM RESPONSIVE TO AMBIENT LIGHTING CONDITIONS

(75) Inventor: Ian Edward Ashdown, West Vancouver (CA)

(73) Assignee: Koninklijkle Philips Electronics N.V., Eindhoven (NL)

( * ) Notice: Subject to any disclaimer, the term of this patent is extended or adjusted under 35 U.S.C. 154(b) by 585 days.

(21) Appl. No.: 13/146,424

(22) PCT Filed: Jan. 8, 2010

(86) PCT No.: PCT/IB2010/050071
§ 371 (c)(1),
(2), (4) Date: Jul. 27, 2011

(87) PCT Pub. No.: WO2010/086757
PCT Pub. Date: Aug. 5, 2010

(65) Prior Publication Data
US 2011/0282468 A1    Nov. 17, 2011

Related U.S. Application Data

(60) Provisional application No. 61/148,205, filed on Jan. 29, 2009.

(51) Int. Cl.
*G05B 11/01* (2006.01)
*H05B 37/02* (2006.01)

(52) U.S. Cl.
CPC ............ *H05B 37/0272* (2013.01); *H05B 37/02* (2013.01); *H05B 37/0245* (2013.01)
USPC .................. 700/11; 700/99; 700/22; 700/275

(58) Field of Classification Search
None
See application file for complete search history.

(56) References Cited

U.S. PATENT DOCUMENTS

| | | | | |
|---|---|---|---|---|
| 3,147,624 | A * | 9/1964 | Trimble | 73/462 |
| 2003/0090210 | A1* | 5/2003 | Bierman | 315/149 |
| 2003/0120817 | A1* | 6/2003 | Ott et al. | 709/249 |
| 2006/0076908 | A1 | 4/2006 | Morgan et al. | |
| 2006/0125426 | A1* | 6/2006 | Veskovic et al. | 315/312 |
| 2007/0216313 | A1* | 9/2007 | Soccoli et al. | 315/149 |
| 2007/0273307 | A1 | 11/2007 | Westrick et al. | |
| 2008/0183337 | A1 | 7/2008 | Szabados | |
| 2009/0041161 | A1* | 2/2009 | Jian et al. | 375/319 |

FOREIGN PATENT DOCUMENTS

| | | | | |
|---|---|---|---|---|
| WO | | 2008104927 A2 | 9/2008 | |
| WO | WO 2008104927 A2 * | | 9/2008 | H05B 37/02 |

* cited by examiner

*Primary Examiner* — Sean Shechtman
(74) *Attorney, Agent, or Firm* — Meenakshy Chakravorty

(57) ABSTRACT

A controller, method and system, for controlling lighting responsive to ambient lighting conditions are described. In particular, disclosed is illumination controller (110) for controlling illumination of a workspace near a display (253). The illumination controller includes a memory device (113) storing a user's preference for illumination of the workspace; a processor (111) accessing the user's preference in the memory device; and an interface (112) between the processor and an electronic sensor (231) located proximate to the display, which collects a reading from the electronic sensor. The processor compares the reading with the user's preference, and sends a command to at least one luminaire (241) to adjust the illumination of the workspace. The electronic sensor can be, for example, a photosensor, an occupancy sensor, an orientation sensor, or a location sensor. In some embodiments, the interface collects the reading from the electronic sensor via a wireless communication link.

6 Claims, 10 Drawing Sheets

LIGHTING CONTROL SYSTEM RESPONSIVE TO AMBIENT LIGHTING CONDITIONS

TECHNICAL FIELD

The invention is directed generally to an illumination system, and particularly to an illumination control system.

BACKGROUND

Conventional architectural lighting systems such as office lighting systems are often managed by dedicated lighting control hardware. These systems typically include a central controller that is hardwired to remote photosensors, wall switches, and/or occupancy sensors for input data, and to relay panels or dimmer racks for luminaire control. The controller is usually responsible for dimming and switching the luminaires in response to input signals from daylight sensors and occupancy sensors, as well as scheduled events. The controller is typically programmed by means of a dedicated control panel.

These conventional lighting systems have a number of disadvantages. For example, the remote photosensors, wall switches, and occupancy sensors must be hardwired to the controller using low-voltage wiring routed through dedicated conduits. This represents a significant expense during building construction.

Another potential disadvantage of the conventional systems is that the sensors, e.g., photosensors or occupancy sensors, are usually fixed to the ceiling or the wall. Fixed sensors may have drawbacks in open offices where cubicle layouts often change in response to building tenant requirements. Thus, fixed sensor locations which are optimal for one configuration of cubicles and office furniture may be poor or even inoperable for other configurations.

Another potential disadvantage of the conventional systems is that the fixed sensors typically do not detect the lighting that is directly applied to the area occupied or operated in by the user. While the user is operating, for example, the display of a computer, a ceiling-mounted or wall-mounted sensor typically detects the light at the location of the sensor, which is only indirectly related to the lighting directly applied to the area around the display.

Yet another potential disadvantage of the conventional systems is that the central controllers are often located in service rooms or closets and are thus inaccessible to most office workers. Even when the controllers are accessible, their proprietary user interfaces are often difficult to understand and use. Consequently, the lighting system is usually programmed only once during system commissioning and afterwards it is not re-programmed, even when the layout of the office, or its lighting requirements, change.

Further, most central controllers are capable of storing events, such as weekly and yearly schedules, that turn off the luminaires on weekends and holidays. However, due to the difficulty of programming the conventional controllers, their event scheduling capabilities are usually underutilized. As a result, the luminaires are often turned on when they are not required, thus wasting energy.

SUMMARY

The lighting control systems, according to various embodiments and implementations of the present invention, address the shortcomings of the conventional approaches. For example, some embodiments feature lighting controllers that monitor sensors that are not hardwired to a ceiling or wall mount location. These sensors may be located near or inside the work area of the users, such as proximate to a computer display or other equipment operated by the user. These sensors may be easily re-located every time the work areas are reconfigured or their layout changes. The sensors may even move with the user whenever the user moves to work in a new location, for example, within the office building. Furthermore, sensors that are proximate to the user display may be more effective at detecting the light that is most directly useful to the user. The sensors may be, for example, integral to a devices operated by the user, such as desktop or laptop computers.

The lighting controllers use the information from these sensors to control a plurality of luminaires, for example, a lighting network in accordance with the user-defined or some default settings. These luminaires can be located or directed such that they affect the illumination of the area near the work area of the user. For example, the lighting network may include one or more of the luminaires located at predetermined locations on the ceiling or on the wall, and oriented at particular angles such that they illuminate the area near the computer display or other equipment operated by the user.

Various embodiments of the invention focus on enabling control of the illumination of a work area based on sensors that do not have a dedicated hardwire connectivity from the controller to a ceiling or wall mount location. For example, in some embodiments, the sensor can be an addressable device, or integrated to an addressable device, e.g., a computer or a mobile phone, that is connected to a network, e.g., an Ethernet or a wireless network. The controller can also be another addressable device connected to the same network. The controller can identify the sensor by polling the network for all addressable sensors or addressable devices that are integrated with a sensor. Alternatively, the controller can identify a sensor by receiving a request from the sensor or the device.

In some embodiments, the controller uses a sensor interface in order to collect a reading provided by the sensor. The controller can determine the location of the sensor, or the orientation of the display to which the sensor is attached, from a reading provided by the sensor interface. Alternatively, in some embodiments, the controller can determine the location of the sensor from the network address associated with the sensor. In some embodiments, the controller uses the information about the location of the sensor or the orientation of the display, to identify one or more luminaires that affect the illumination of the area near the sensor. Further, in some embodiments, the controller uses the information provided by the user interface to determine information about the ambient light in the area near the sensor or the presence of a user in the area near the sensor. The controller uses this information to control one or more luminaires that affect the illumination of the area near the sensor. In some other embodiments, the controller uses the information provided by two or more sensors to detect a potential error in the information provided by one of the sensors, or to determine an average reading representing the average or global distribution of light in the work area.

Embodiments of the invention include an illumination controller for controlling illumination of a workspace near a display. The illumination controller comprises a memory device storing a user's preference for illumination of the workspace; a processor accessing the user's preference in the memory device; and an interface between the processor and an electronic sensor located proximate to the display, the interface collecting a reading from the electronic sensor. The processor compares the reading with the user's preference, and sends a command to at least one luminaire to adjust the illumination of the workspace.

Other embodiments of the invention include a storage medium for storing a processor-readable program executable by a processor. The program causes the processor to control an illumination of a workspace near a display by performing the functions of: collecting a reading from an electronic sensor located proximate to the display via a sensor interface; comparing the reading to an illumination parameter; and sending an adjustment command to at least one luminaire to adjust the illumination of the workspace based at least in part on the illumination parameter.

In some embodiments, the program further causes the processor to perform one or more of the following functions: determining the location of the electronic sensor in order to identify the at least one luminaire, identifying the electronic sensor located proximate to the display, sending a query for any electronic sensor that is capable of signal communication with the processor, receiving a query from the electronic sensor for a processor that is capable of signal communication with the electronic sensor, and comparing readings of multiple sensors to determine the appropriate adjustment command.

Still other embodiments of the invention include an illumination system for illuminating a workspace near a display. The system includes an illumination controller, an electronic sensor located proximate to the display, at least one luminaire, and a communication network. The communication network transmits signals between the illumination controller and the electronic sensor, and between the illumination controller and the at least one luminaire. The illumination controller receives a signal representing a reading from the electronic sensor, compares the signal with a user's preference, and sends a command to the at least one luminaire to adjust the illumination of the workspace. In some embodiments of the invention, the communication network and/or controller interface is selected to enable at least one sensor and/or at least one luminaire to be readily reconfigured.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed. The accompanying drawings, which are incorporated in and constitute a part of this specification, illustrate embodiments of the invention and together with the description, serve to explain the principles of the invention.

DETAILED DESCRIPTION

Reference will now be made in detail to the exemplary embodiments of the invention, examples of which are illustrated in the accompanying drawings.

Figure 1:
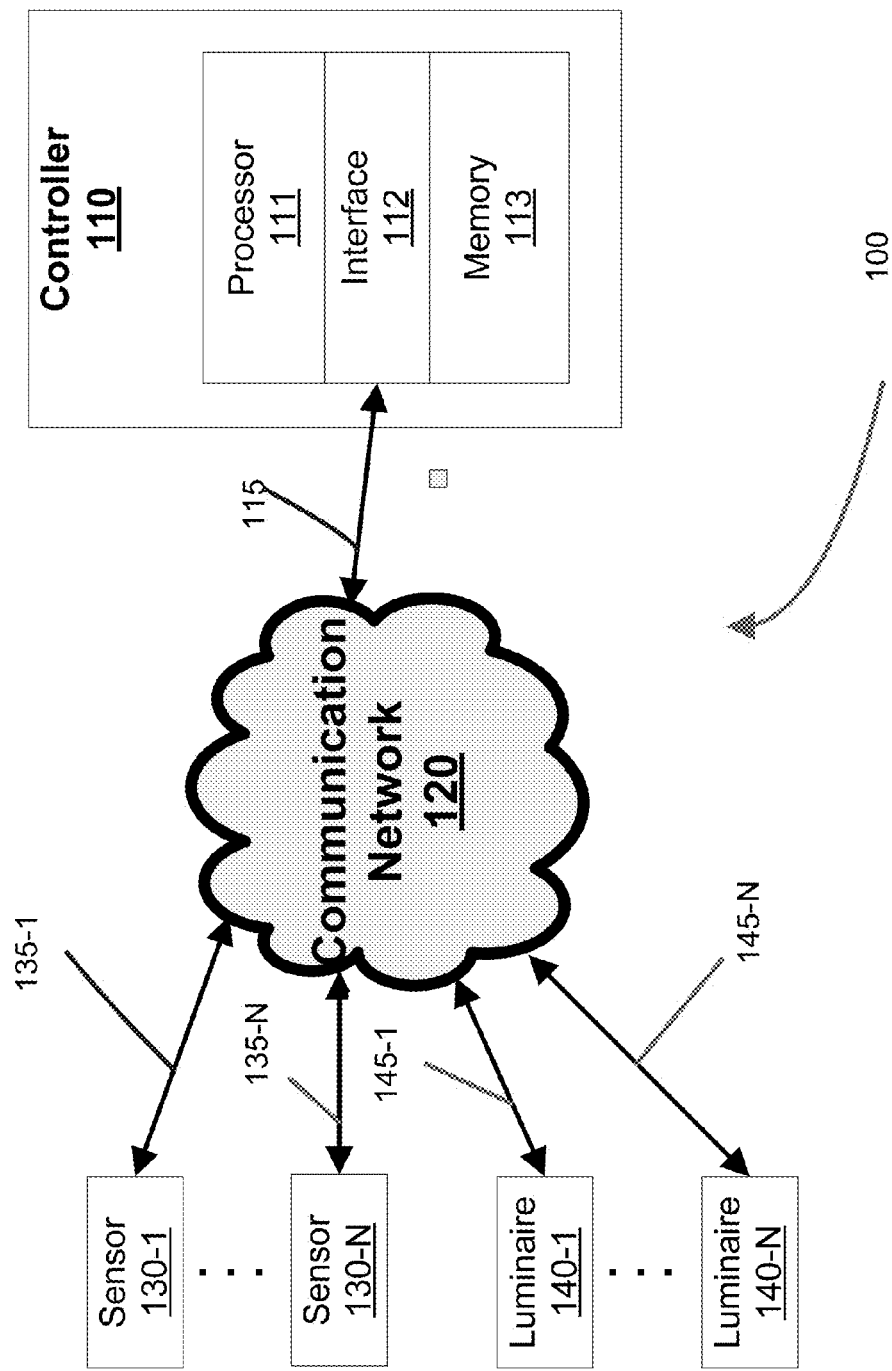
FIG. 1 illustrates an illumination system according to some embodiments of the invention.

FIG. 1 illustrates an illumination system 100 according to some embodiments of the invention. System 100 includes a controller 110, one or more electronic sensors 130-1 to 130-N, one or more luminaires 140-1 to 140-N, and a communication network 120 with a plurality of communication links 115, 135-1 to 135-N, and 145-1 to 145-N.

Controller 110 controls the illumination of one or more user workspaces based on communications with sensors 130 and with luminaires 140 through communication network 120. Controller 110 of some embodiments uses these communications to discover the presence and/or the location of one or more sensors or luminaires. Controller 110 uses the information about the location of the one or more sensors and the location of the one or more luminaires to map each sensor to one or more luminaires that illuminate the workspace associated with that sensor. Controller 110 receives readings from one or more sensors, indicative of the lighting in the workspace associated with that sensor, and uses that reading to create and send a command to one or more luminaires to adjust the illumination in that workspace.

As illustrated in FIG. 1, embodiments of controller 110 feature a processor 111, an interface 112, and a memory device 113. The term "controller" is used herein generally to describe various apparatus relating to the operation of one or more luminaires. A controller can be implemented in numerous ways (e.g., such as with dedicated hardware) to perform various functions discussed herein. A controller that employs one or more processors may be programmed using software (e.g., microcode) to perform various functions discussed herein. A controller may be implemented as a combination of dedicated hardware to perform some functions and a processor (e.g., one or more programmed microprocessors and associated circuitry) to perform other functions. Embodiments of processor 111 include, but are not limited to, conventional microprocessors, application specific integrated circuits (ASICs), and field-programmable gate arrays (FPGAs).

Embodiments of memory device 113 include various types of storage media, e.g., volatile and non-volatile computer memory such as RAM, PROM, EPROM, and EEPROM, floppy disks, compact disks, optical disks, magnetic tape. In some implementations, the storage media may be encoded with one or more programs that, when executed on processor 111, controller 110 performs at least some of the functions discussed herein. Various storage media may be transportable, such that the one or more programs stored thereon can be loaded into a processor so as to implement various aspects of the present invention discussed herein. The terms "program" or "computer program" are used herein in a generic sense to refer to any type of computer code (e.g., software or microcode) that can be employed to program one or more processors. In some embodiments of the invention, memory device 113 also stores parameters, for example, default settings for the illumination of a workspace area, or a user's preference for the illumination of the user's workspace. In some embodiments, controller 110 is an addressable device.

Interface 112 is a communication interface between controller 110 and communication network 120. In some embodiments of the invention, interface 112 is used by processor 111 to exchange communication signals with sensor(s) 130 and/or luminaire(s) 140 via communication link 115 and communication network 120. Embodiments of interface 112 can be implemented as hardware or software, or a combination of hardware and software, for example, a network interface card, or a wireless interface card and accompanying software. Interface 112 can also include a user interface for interacting with sensors 130 and/or with controller 110. Interface 112 may comply with the Advanced Configuration and Power Interface (ACM) open industry standard which defines platform-independent interfaces for hardware discovery, configuration, power management, and monitoring of desktop and laptop computers, and which includes interfaces for querying sensors attached to or in communication with the computer.

Examples of user interfaces that may be employed in various implementations of the invention include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto. Yet, other examples of such a user interface include a sensor specific user interface enabling a user to directly query each sensor separately.

In some other embodiments of the invention, interface 112 includes a controller user interface, via which a user can interact with the controller, for example, to set a user-defined parameter, or to enter information about a luminaire 140 and/or a sensor 130.

Communication network 120 is a network used by the controller to communicate with sensors 130 and luminaires 140. Communication network 120 can include, for example, a wired network, or a wireless network or a combination of different wired and wireless networks. Communication network 120 may employ different technologies, e.g., infrared communication, fiber optics communication, or computer networking technologies, for example, Ethernet technologies. Communication network 120, can also include a local area network (LAN) or a wireless local area network (WLAN). For example, communication network 120 can include wired or wireless computer communication technologies between controller 110 and one or more of sensors 130, combined with dedicated hardwired communication technologies between controller 110 and one or more of luminaires 140. In some other embodiments, communication network 120 includes freespace optical communication technologies which utilize, for instance, infrared or modulated visible light signals.

The term "network" as used herein refers to any interconnection of two or more devices (including controllers or processors, luminaires, or sensors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the invention, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network. In one network implementation, one or more devices coupled to a network may serve as a controller for one or more other devices (e.g., luminaires and/or sensors) coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

Sensor(s) 130 measures a stimulus and transforms its measurement or measurements into one or more signals. Sensor 130 can be, for example, a photosensor which measures one or more aspects of light near the sensor, such as light intensity or spectral power distribution; or an occupancy sensor, e.g., a motion detector, which detects presence of a user near the sensor; or a location sensor, e.g., a GPS device, which determines the location of the sensor; or an orientation sensor, e.g., a GPS device, which determines the orientation of the sensor. Sensor 130 communicates those signals via communication link 135 and through communication network 120 to controller 110. Embodiments of communication link 135 include a wireless link, an Ethernet link, a fiber, an infrared or a visible light communication link.

Some embodiments of the invention require sensor 130 to be located proximate to a display used by the user. A sensor 130 proximate to a display is positioned such that it can measure the light incident upon the display. For instance, it may be attached to the display or integral to a computer or a mobile device associated with the display. Alternatively, a sensor 130 proximate to a display can measure another stimulus indicative of a condition imposed on the display or an integrally-related device.

In some embodiments, sensor 130 is an addressable device directly communicating over the communication network 120. In other embodiments, sensor 130 is an internal or an external sensor that is integrated with an addressable device and communicates over the communication network 120 through that addressable device.

The term "addressable" is used herein to refer to a device (e.g., a luminaire, a controller, other non-lighting related devices, a sensor, a device to which a sensor is integrated, etc.) that is configured to receive information (e.g., data) intended for multiple devices, including itself, and to selectively respond to particular information intended for it. The term "addressable" often is used in connection with a networked environment, in which multiple devices are coupled together via some communication network.

In some embodiments, luminaires 140 include one or more luminaires that are installed in fixed locations, and are capable of communicating with controller 110 through dedicated hardwired communication links 145. In some other embodiments, luminaires 140 include one or more addressable luminaries which communicate through other types of communication links 145, for example, an Ethernet or a wireless network connection. The communications between controller 110 and luminaires 140 can include commands sent from controller 110 to luminaires 140. These commands can cause the luminaire to, for example, turn on, or turn off, or to decrease or increase the intensity, or to change the spectral power distribution, of its illumination.

The terms "luminaire" or "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), and photo-luminescent sources (e.g., gaseous discharge sources).

A given light source may be configured to generate electromagnetic radiation within the visible spectrum, outside the visible spectrum, or a combination of both. Hence, the terms "light" and "radiation", and illumination, are used interchangeably herein. Additionally, a light source may include as an integral component one or more filters (e.g., color filters), lenses, or other optical components. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources). The term "spectral power distribution" is understood to refer to the power per unit area per unit wavelength of an illumination, or the per-wavelength contribution to any radiometric quantity (e.g., radiant energy, radiant flux, radiant intensity, or radiance).

Figure 2:
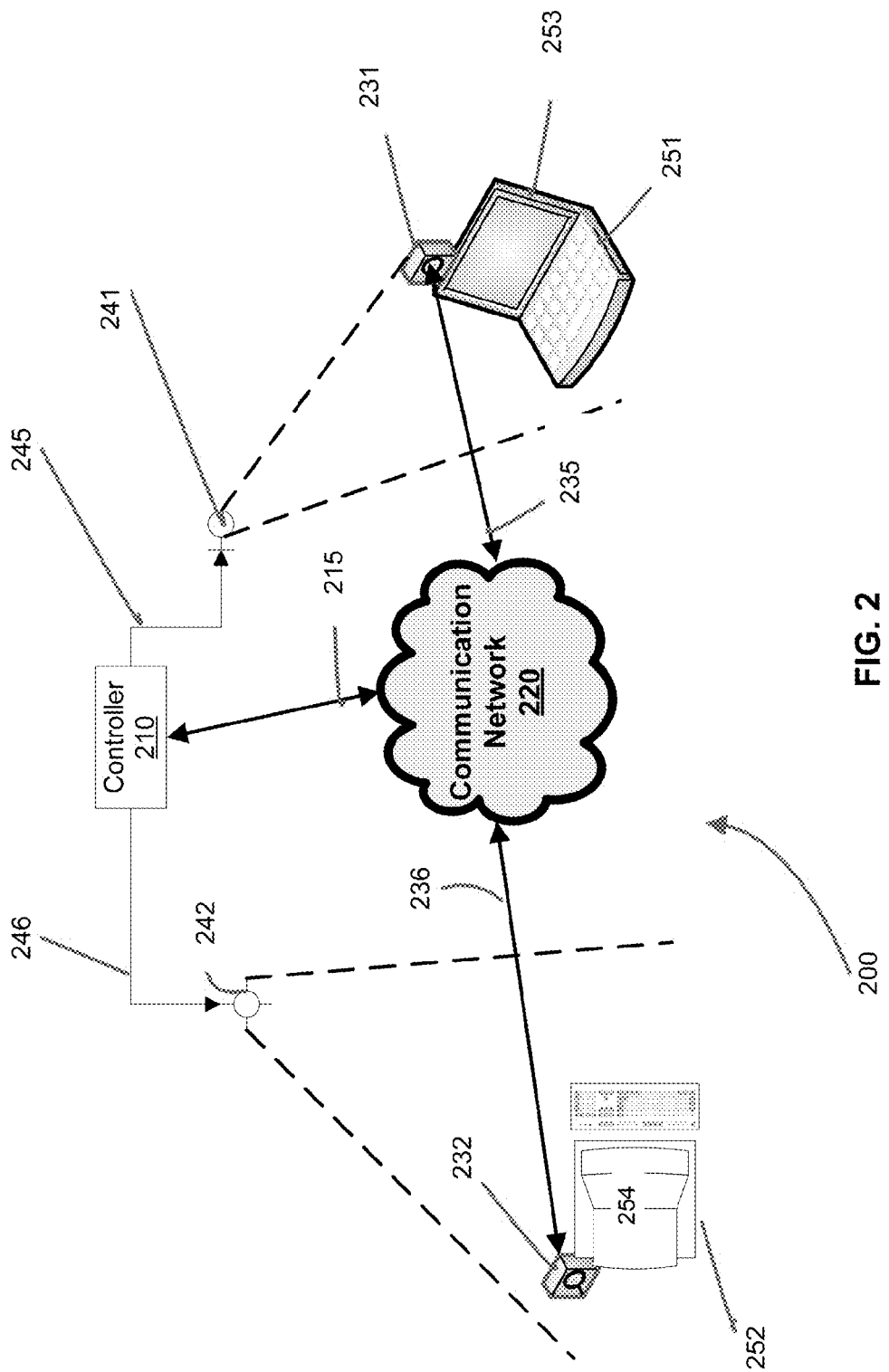
FIG. 2 illustrates an illumination system according to some other embodiments of the invention.

FIG. 2 illustrates an illumination system 200 according to embodiments of the invention. System 200 includes controller 210, sensors 231 and 232, luminaires 241 and 242, mobile computer 251, and desktop computer 252, and communication network 220 with communication links 215, 235, 236, 245, and 246.

Controller 210 is connected to communication network 220 via communication link 215 and utilizes communication network 220 to communicate with sensors 231 and 232, via communication links 235 and 236, respectively. Controller 210 also communicates with luminaires 241 and 242 via communication links 245 and 246 respectively.

Controller 210 can be any type of controller described with respect to controller 110 of FIG. 1. Controller 210 controls the illumination of the workspaces near mobile computer 251, and non-mobile computer 252. Communication network 220 can be any type of communication network described with respect to communication network 120 of FIG. 1.

Mobile computer 251 can be a laptop computer, or another type of mobile device, such as a mobile phone, that can be frequently relocated by its user. Desktop computer 252 can be replaced with any other type of device that generally has a fixed location, or is relocated infrequently, such as when the layout of the office is changed.

Sensors 231 and 232 can each be any type of sensor described in relation to sensor 130 of FIG. 1 and can each have any of the alternative features described with respect to sensor 130 of FIG. 1. Sensor 231 is located proximate to display 253 of mobile computer 251, while sensor 232 is located proximate to display 254 of desktop computer 252. Sensor 231 can be, for example, an internal device installed in mobile computer 251 or an external device installed near or on display 253 of mobile computer 251. Similarly, sensor 232 can be an internal device in non-mobile computer 252 or an external device installed near or on display 254. Sensors 231 and 232 can be addressable devices that communicate with controller 210 via communication links 235 and 236, respectively, and through communication network 220. Additionally or alternatively, sensors 231 and 232 might communicate with controller 210 through user interfaces provided by computers 251 and 252. In this case, communication links 235 and 236 can represent the links between the communication network 220 and computers 251 and 252 respectively.

Luminaires 241 and 242 can be any type of luminaire described in relation to luminaires 140 in FIG. 1. Luminaires 241 and 242 communicate with controller 210 via communication links 245 and 246 respectively, which can be any type of communication link described in relation to luminaire links 145 in FIG. 1. In some embodiments, luminaires 241 and 242 are selected by controller 210 from among multiple luminaires having known locations, such that they illuminate specific areas of the workspace. For instance, luminaire 241 can be a wall mounted luminaire that illuminates the workspace near display 253. Luminaire 242, on the other hand, can be a ceiling mounted luminaire that illuminates the workspace near display 254. In some embodiments, controller 210 discovers information about the sensors and luminaires, in order to control the illumination of the workspaces near displays.

Although only two sensors are illustrated in FIG. 2, an illumination system 200 in accordance with the invention may include many more sensors. For example, multiple sensors may be near any single workspace. The sensors near any single workspace may detect the same or different types of stimuli. For example, multiple photosensors in an exemplary illumination system 200 may be located at different places proximate to a single workspace. Additionally or alternatively, one or more motion detectors in an exemplary illumination system 200 may be located near a single work space. A single sensor in illumination system 200 may provide information related to one or more workspaces.

Similarly, although only two luminaires are illustrated in FIG. 2, an illumination system 200 in accordance with the invention may include many more luminaires. For example, multiple luminaires may be capable of illuminating any single workspace. These luminaires may provide different types or different intensities of illumination. Similarly, individual luminaires may be located such that they are capable of illuminating different portions of any single workspace. On the other hand, a single luminaire may provide illumination to one or more workspaces. Obstacles within or near a single workspace may change the area which any luminaire is capable of illuminating. Such obstacles may be permanent or ephemeral. For example, a person walking by a luminaire can temporarily prevent the luminaire from illuminating a portion of a workspace. At the other extreme, a load bearing wall can prevent the luminaire from illuminating a portion of a workspace unless the wall or the luminaire is moved.

Figure 3A:
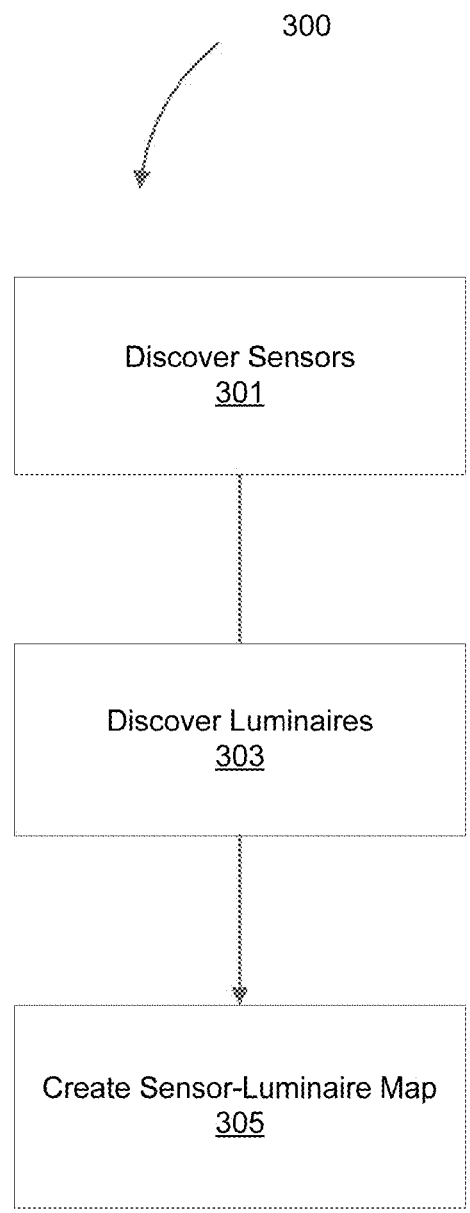
FIG. 3A illustrates a discovery flow chart performed for an illumination controller, according to some embodiments of the invention.

FIG. 3A illustrates an exemplary discovery flow chart 300, performed by controller 210, according to some embodiments of the invention. In step 301, controller 210 discovers one or more sensors. In step 303, controller 210 discovers one or more luminaires. In step 305, controller 210 creates a sensor-luminaire map which maps each sensor with one or more luminaires that illuminate the workspace area near the display associated with that sensor. Embodiments of the invention may not feature step 301 or step 303, and may instead use information already available to controller 210 to perform step 305.

Figure 3B:
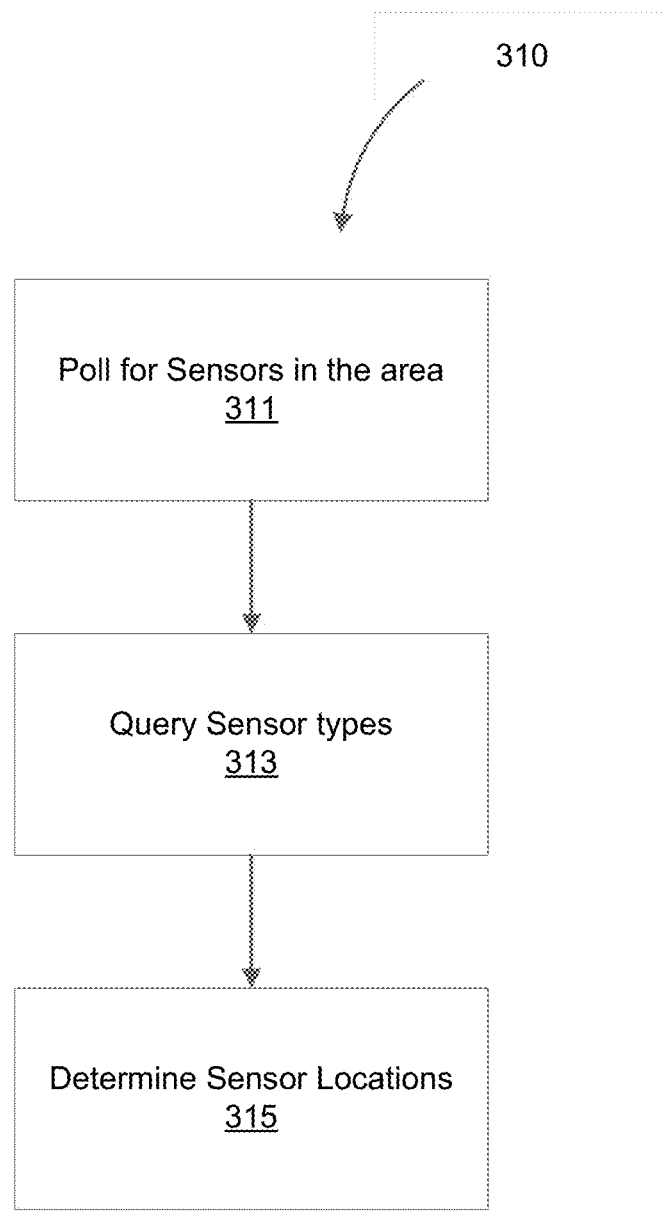
FIG. 3B illustrates a sensor discovery flow chart according to some embodiments of the invention.

FIG. 3B illustrates an example of sensor discovery step 301 of FIG. 3A in more detail, through flow chart 310, as performed by illumination controller 210 according to some embodiments of the invention. Step 301 may not feature one or more of the steps illustrated in FIG. 3B. Steps of FIG. 3B may be combined or ordered differently than shown in FIG. 3B.

In step 311, controller 210 establishes communication with sensors that are located in different workspaces. In some embodiments, controller 210 performs step 311, by sending a network query to identify addressable sensor devices that communicate through the same communication network 220 or through a particular node in the communication network 220. In some other embodiments, controller 210 performs step 311 by receiving a network query from an addressable sensor, that identifies the sensor as a device that communicates through the same communication network 220 or through a particular node in the communication network 220. Step 311 may feature a combination of any of the foregoing technologies.

In step 313, controller 210 collects information about the type of each identified sensor. In some embodiments, controller 210 performs step 313 by reading information about the sensor from the user interface provided by the sensor or provided by the device in which the sensor is integrated. In other embodiments, controller 210 performs step 313 by directly querying the sensor. In yet other embodiments, controller 210 performs step 313 by accessing information about the sensor which are pre-recorded in memory 113 or in another memory storage accessible to controller 210, e.g., the memory of computer 251 or computer 252.

In step 315, controller 210 determines the general physical location of each identified sensor. In some embodiments, controller 210 performs step 315 by using the network address of the sensor or of the device in which the sensor is integrated. In some embodiments, for instance, those using wired networks, a network address can indicate the physical location of the sensor. In some other embodiments, controller 210 can determine the location of the sensor by other means, e.g., reading a location sensor installed near or attached to the same computer with which the sensor is integrated. The location can be shown by geographical coordinates, e.g., as provided by a GPS device, or by some other identification, e.g., using a partition code of the office space. In some embodiments, step 315 also includes determining the orientation of the sensor, or preferably the orientation of the display with which the sensor is associated.

TABLE 1

| Row # | Sensor ID | Workspace ID | Sensor Type |
|-------|-----------|--------------|--------------------|
| 1     | S1        | A2           | Occupancy Sensor   |
| 2     | S2        | A2           | Photosensor        |
| 3     | S3        | C3           | Photosensor        |
| 4     | S4        | C3           | Orientation Sensor |
| 5     | S5        | A5           | Occupancy Sensor   |

Table 1 illustrates an exemplary sensor information table which may be created in step 301 of FIG. 3A, in accordance with embodiments of the invention, and features three types of data, illustrated in three data columns. For each discovered sensor, Table 1 includes the identification of the sensor, the identification of the workspace associated with the sensor, and the type of the sensor. Alternative arrangements and storage of sensor information are within the scope of the invention. For example, row 1 of Table 1, indicates that sensor S1, is associated with workspace A1, and is an occupancy sensor. The sensor ID can be, for example, a Universal Product Code (UPC) of the sensor, or an internal ID for the sensor, or any other identification that uniquely identifies the sensor to controller 210. Alternative or more specific sensor types are within the scope of the invention. Table 1 may be stored in memory 113 or in another memory storage accessible to controller 210, e.g., the memory of computer 251 or computer 252. In some embodiments, the identification of the workspace with which a sensor is associated, is based on the location of the sensor. In some other embodiments, the workspace ID also includes information about the direction of the display associated with the sensor. For example, two displays in the same general location, but oriented differently can have different workspaces, because they can be illuminated by different luminaires emitting light in different directions. As illustrated in rows 1 and 2 of Table 1, more than one sensor can be associated with the same workspace ID. This association may exist because the sensors are integrated or associated with the same computer or the same display, or with computers and displays that are located close to each other and are oriented in the same direction. Thus, for example, rows 1 and 2 indicate that both sensors S1 and S2 are associated with the workspace identified as A2, while rows 3 and 4 indicate that sensors S3 and S4, a photosensor and an orientation sensor, respectively, are both associated with workspace C3.

Figure 3C:
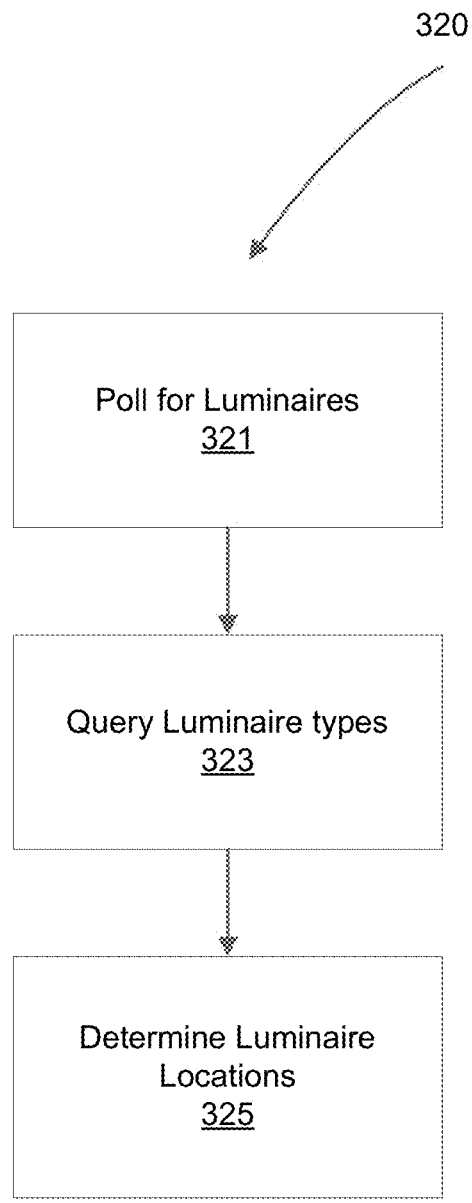
FIG. 3C illustrates a luminaire discovery flow chart according to some embodiments of the invention.

FIG. 3C illustrates an example of luminaire discovery step 303 of FIG. 3A in more detail, through flow chart 320, as performed by illumination controller 210 according to some embodiments of the invention. Step 303 may not feature one or more of the steps illustrated in FIG. 3C. Steps of FIG. 3C may be combined or ordered differently than shown in FIG. 3C.

In step 321, controller 210 establishes communication with luminaires that are located in the controlled workspaces. In some embodiments, controller 210 performs step 321 by sending queries to, or receiving queries from, addressable luminaires that communicate through the same communication network, as explained for sensors in relation to step 311. In some other embodiments, controller 210 performs step 321 by reading pre-recorded information about luminaires that are in communication with controller 210 through a dedicated hardwired communication link. This pre-recorded information may be stored in memory 113 or in another memory storage accessible to controller 210, e.g., the memory of computer 251 or computer 252. Step 321 may feature a combination of any of the foregoing technologies.

In step 323, controller 210 collects information about the type of each identified luminaire. In some embodiments, controller 210 performs step 323 by directly querying the luminaire about its type. In some embodiments, controller 210 performs step 323 by reading pre-recorded information, similar to those explained with respect to step 321.

In step 325, controller 210 determines the physical location of each identified luminaire. In some embodiments, controller 210 performs step 325 for addressable luminaires via mechanisms similar to those explained for addressable sensors in relation to step 315. In some other embodiments, controller 210 performs step 325 by reading pre-recorded information about the location of the luminaire, similar to those explained with respect to step 321. In some embodiments, step 325 also includes determining the orientation of the luminaire, which, together with the location, can be used to determine the area illuminated by the luminaire.

TABLE 2

| Row # | Luminaire ID | Workspace ID | Luminaire type |
|---|---|---|---|
| 1 | L1 | C2 | Red LED |
| 2 | L2 | A1 | Blue LED |
| 3 | L3 | A1 | Fluorescent |
| 4 | L4 | B4 | White spectrum bulb |
| 5 | L5 | C3 | White spectrum LED set |

Table 2 illustrates an exemplary luminaire information table which may be created in step 303 of FIG. 3A, in accordance with embodiments of the invention. Table 2 features three types of data, illustrated in three data columns. For each discovered luminaire, Table 2 includes the identification of the luminaire, the identification of the workspace illuminated by the luminaire, and the type of the luminaire. Each luminaire in the table is identified with an ID, defined, for example, similar to the sensor ID explained in relation to Table 1. Alternative or more specific luminaire types are within the scope of the invention. Table 2 may be stored in memory 113 or in another memory storage accessible to controller 210, e.g., the memory of computer 251 or computer 252. Alternative arrangements and storage of luminaire information are within the scope of the invention.

In some embodiments, the workspace illuminated by a luminaire is identified based on the location of the area illuminated by the luminaire. The illuminated workspace can be determined, for example, by using the location and the height of the luminaire, as well as the direction in which the luminaire emits light. As illustrated in rows 2 and 3 of Table 2, multiple luminaires can illuminate the same workspace. Thus, for example, rows 2 and 3 show that luminaires, L2 and L3, respectively a Blue LED and a fluorescent luminaire, both illuminate the same workspace A1.

TABLE 3

| Row # | Sensor ID | Luminaire ID |
|---|---|---|
| 1 | S1 | L3 |
| 2 | S1 | L5 |
| 3 | S2 | L1 |
| 4 | S3 | L1 |
| 5 | S4 | L5 |

Table 3, illustrates an exemplary sensor-luminaire map, which may be created in step 305 of FIG. 3A, in accordance with embodiments of the invention. Table 3 features two types of data, illustrated in two data columns. Each row of Table 3 includes the identification of a sensor, and the identification of a luminaires mapped to that sensor. Table 3 may be stored in memory 113 or in another memory storage accessible to controller 210, e.g., the memory of computer 251 or computer 252. Alternative arrangements and storage of the sensor-luminaire map are within the scope of the invention.

In some embodiments, controller 210 uses discovery information similar to those illustrated in Tables 1 and 2 and maps a sensor associated with a workspace, to a luminaire that illuminates the same workspace. For instance, row 1 of Table 3 shows that sensor S1 is mapped to luminaire L3, indicating that the workspace proximate to S1 is illuminated by luminaire L3. As illustrated in rows 1 and 2, a sensor can be mapped to more than one luminaire. Alternatively, as illustrated in rows 3 and 4, a luminaire can be mapped to more than one sensor. Thus, for example, rows 1 and 2 show that sensor S1 is mapped to luminaires L3 and L5, indicating that the workspace associated with S1 is illuminated by both L3 and L5. On the other hand, rows 3 and 4 show that both sensors S2 and S3 are mapped to luminaire L1, indicating that the workspaces associated with S2 and S3 are both illuminated by L1.

Figure 3D:
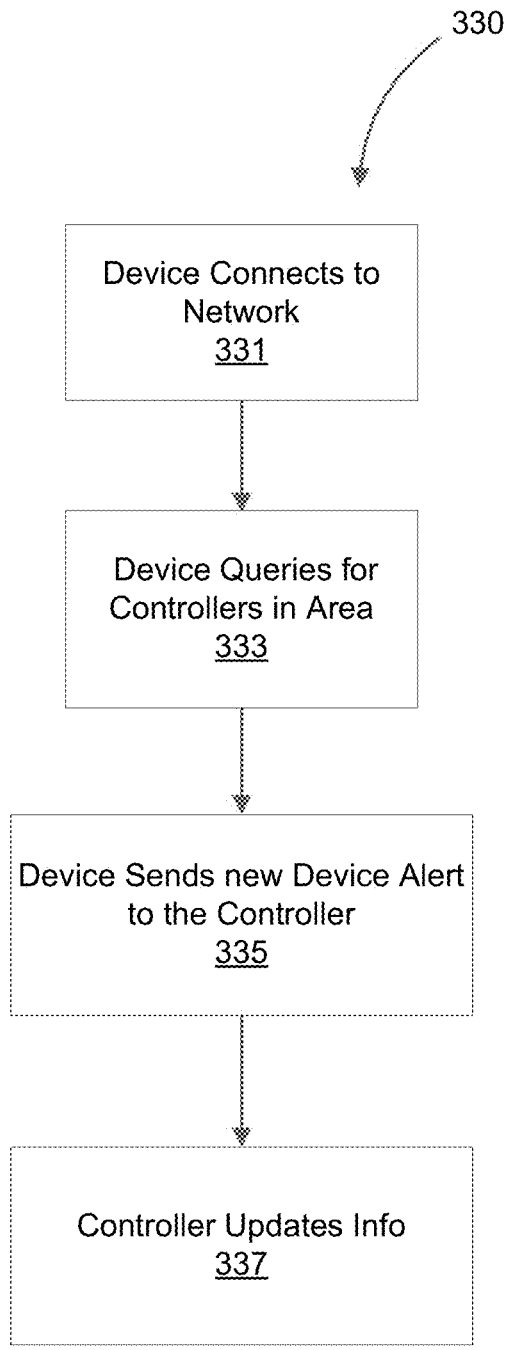
FIG. 3D illustrates a new device discovery flow chart according to some embodiments of the invention.

FIG. 3D illustrates an example of a new device discovery flow chart 330 triggered by the connection of a device to the communication network 220, according to some embodiments of the invention. Steps of FIG. 3D may be combined or ordered differently than shown in FIG. 3D.

In step 331, a device connects to the communication network 220. The device can be, for example, a mobile device 251 or a non-mobile device 252. In step 333, the device sends a query through communication network 220 for a controller that communicates through the same communication network 220. Once controller 210 receives and replies to the query, in step 335 the device sends an alert to the controller, indicating that it has joined the communication network. The alert can also include the network address of the device, for controller 210 to be able to communicate with it. In step 337, controller 210 responds to the alert and updates its information about devices and sensors in the work area. In some embodiments, controller 210 responds to the alert by performing a sensor discovery similar to that of FIG. 3B, and by updating the sensor-luminaire map accordingly.

TABLE 4

| Row # | Device ID | Workspace ID | Occupancy Sensor | Orientation Sensor | photo-sensor |
|---|---|---|---|---|---|
| 1 | D1 | A2 | Yes | Yes | Yes |
| 2 | D2 | A5 | Yes | No | No |
| 3 | D3 | C3 | No | Yes | Yes |

Table 4 illustrates an exemplary device information table which may be created in step 337 of FIG. 3D, in accordance with embodiments of the invention. Table 4 features five types of data, illustrated in five data columns. For each discovered device, Table 4 includes the identification of the device, the identification of the workspace associated with the device, and whether the device is integrated with, or is attached to each one of three types of sensors: an occupancy sensor, an orientation sensor, and a photosensor. Alternative arrangements and storage of device information are within the scope of the invention.

Each device in the table is identified with an identification, which can be defined in a way similar to those described with respect to the sensor and luminaire identifications in Tables 1 and 2. The identification of the workspace associated with the device is also related to the location of the display of the device, in a way similar to that described with respect to sensors in Table 1. Thus, for example, row 1 shows that device D1 is associated with workspace A2, and it includes an occupancy sensor, an orientation sensor, and a photosensor. Row 2, on the other hand, shows that device D2 is associated with workspace A5, and it only includes an occupancy sensor, and does not include an orientation sensor or a photosensor.

Figure 4A:
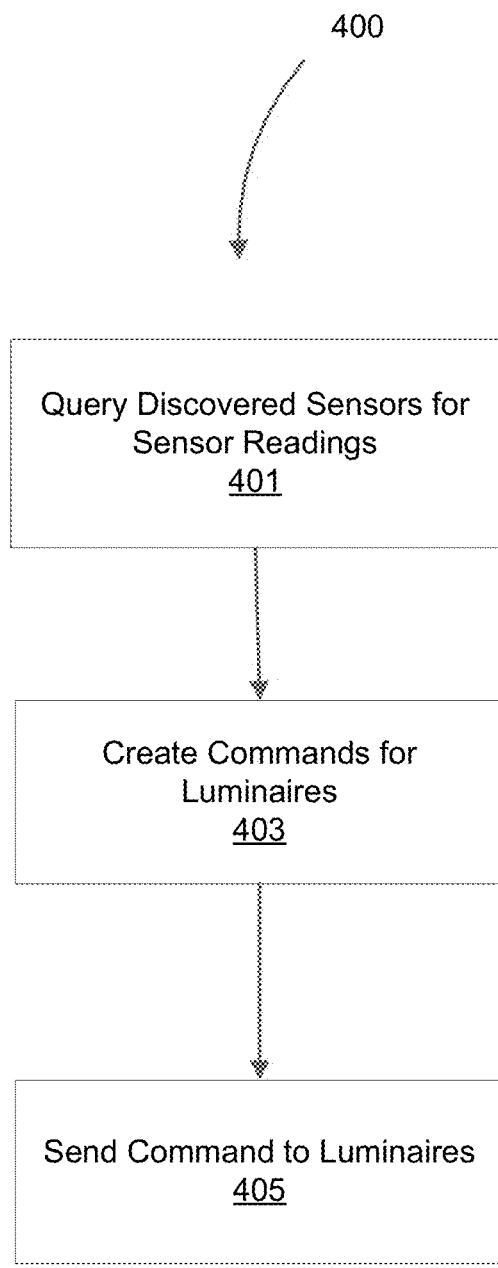
FIG. 4A illustrates a read/command flow chart according to some embodiments of the invention.

FIG. 4A illustrates an exemplary read/command flow chart 400, performed by illumination controller 210, according to some embodiments of the invention. In step 401, controller 210 queries each discovered sensor for a reading. Alternatively, a discovered sensor may send its reading to controller 210. Controller 210 may use interface 112 to perform step 401.

TABLE 5

| Row # | Sensor ID | Reading |
|---|---|---|
| 1 | S1 | Occupied |
| 2 | S2 | High |
| 3 | S3 | Low |
| 4 | S4 | South |
| 5 | S5 | Not Occupied |

Table 5 illustrates an exemplary sensor readings table which may be created in step 401 of FIG. 4A, in accordance with embodiments of the invention. Table 5 features two types of data, illustrated in two data columns. For each sensor, Table 5 indicates the sensor ID and the reading of that sensor. Alternative arrangements and storage of sensor readings information are within the scope of the invention. For example, row 1 of Table 5 shows that the reading of sensor S1, which is an occupancy sensor, indicates that the workspace associated with S1 is occupied by a user. Row 2 shows that the reading of sensor S2, which is a photosensor, indicates that the intensity of light in the workspace associated with S2 is high. Row 4, on the other hand, shows that the reading of sensor S4, which is an orientation sensor, indicates that the display associated with S4 is oriented in the direction labeled South. Alternative or more specific readings are within the scope of the invention. Table 5 may be stored in memory 113 or in another memory storage accessible to controller 210, e.g., the memory of computer 251 or computer 252.

TABLE 6

| Row # | Device ID | Occupancy Sensor reading | Orientation Sensor reading | Photosensor reading |
|---|---|---|---|---|
| 1 | D1 | Occupied | North | High |
| 2 | D2 | Not Occupied | N/A | N/A |
| 3 | D3 | N/A | South-East | Low |

Table 6, illustrates another exemplary sensor readings table which may be created in step 401 of FIG. 4A, in accordance with embodiments of the invention. In these embodiments, controller 210 uses device information similar to that discussed in relation to table 4, to associate sensor readings with devices in the work area. Table 6 features four types of data, illustrated in four data columns. For each discovered device, Table 6 indicates a device ID, and the readings of three types of sensors that might be integrated with or attached to the device.

For example, row 1 of Table 6 shows that for device D1, its occupancy sensor's reading indicates that the workspace associated with D1 is occupied, its orientation sensor reading indicates that D1's display is oriented towards North, and its photosensor reading indicates that the intensity of light in that workspaces is high. Row 2, on the other hand, indicates that for device D2, its occupancy sensor's reading indicates that the workspace associated with D2 is not occupied. The readings of the next two columns are set to N/A because D2 does not have an orientation sensor or a photosensor. R3 shows that for device D3, there is no occupancy sensor, the orientation sensor reading indicates that D2's display is oriented towards South-East, and the photosensor reading indicates that the intensity of light in the workspace associated with D2 is low. Alternative or more specific readings are within the scope of the invention. Table 6 may be stored in memory 113 or in another memory storage accessible to controller 210, e.g., the memory of computer 251 or computer 252.

In step 403 of FIG. 4A, controller 210, based on the readings from one or more sensors, creates one or more commands for one or more luminaires that illuminate the workspace associated with the sensor. Controller 210 can create a command by, for instance, comparing the sensor readings with some default illumination parameters or some user defined illumination parameters reflecting user preferences. Exemplary illumination parameters may include parameters for turning the illumination on or off, or for changing the intensity or the spectral power distribution of the illumination based on the time of the day, or based on occupancy of the workspace. An illumination parameter or user defined preference can, for example, specify to turn the illumination off or on depending on whether a user is absent or present in the workspace. Another illumination parameter or user defined preference can, for example, determine the desired level of light intensity or its spectral power distribution, or the direction that the light must illuminate the display in the workspace. Illumination parameters can be stored in memory 113 or on other storages, for example, on devices 251 and 252. Illumination parameters can be modified by a user, for example, by using a user interface of controller 210 or user interfaces accessible through devices 251 and 252.

In step 405, controller 210 sends the commands to one or more of the luminaires that are mapped to the one or more sensors and thus illuminate the workspace associated with those sensors.

Figure 4B:
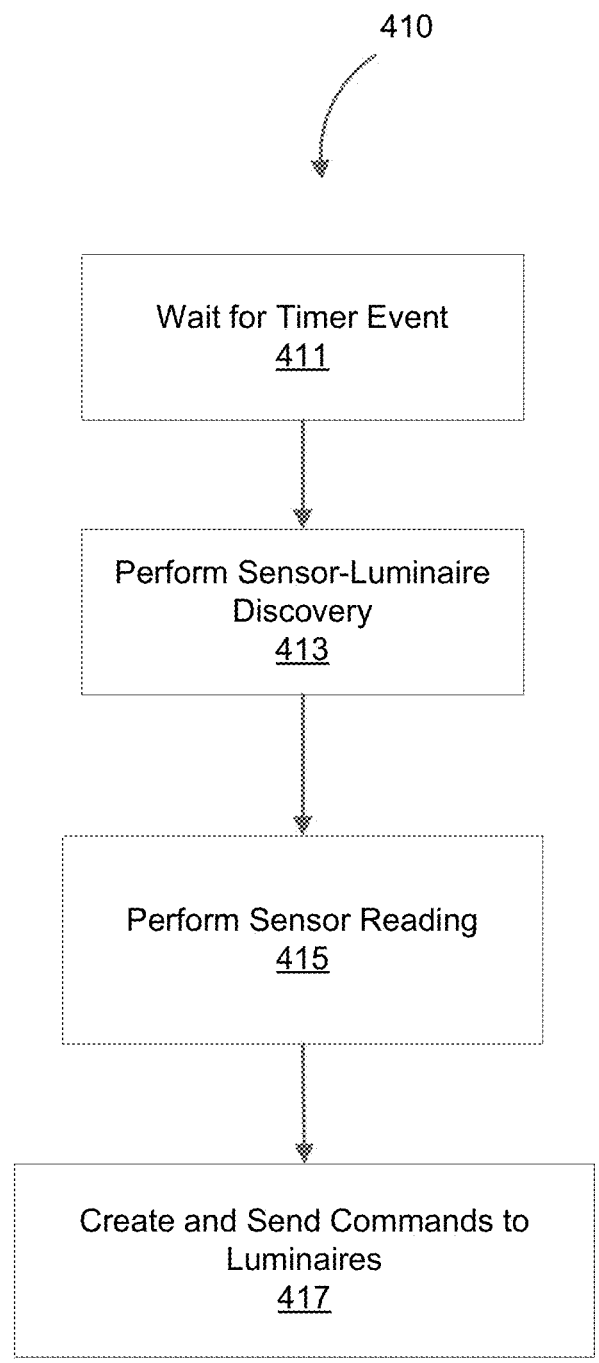
FIG. 4B illustrates a timer event triggered discovery/reading flow chart according to some embodiments of the invention.

In some embodiments, controller 210 performs discoveries or readings based on some timer events, for example, in regular time intervals. FIG. 4B illustrates a timer event triggered discovery/reading flow chart 410, performed by illumination controller 210, according to some embodiments of the invention. In step 411, controller 210 waits for a timer event, for example, for a specific time lapse. Once the timer event occurs, in step 413, controller 210 performs a sensor/luminaire discovery as explained, for example, in relation to flow chart 300 in FIG. 3A. Controller 210 uses the information gathered in this step to create or update one or more of the sensor tables, luminaire tables, device information table, or sensor-luminaire maps, as explained in relation to Tables 1-4.

In step 415, controller 210 performs a sensor reading as explained, for example, in relation to flow chart 400 in FIG. 4A. Controller 210 uses the information gathered in this step to create or update one or more of the sensor readings tables as explained in relation to Tables 5 and 6. In step 417, controller 210 creates commands and sends them to appropriate luminaires, as explained, for example, in relation to flow chart 400 in FIG. 4A.

Figure 4C:
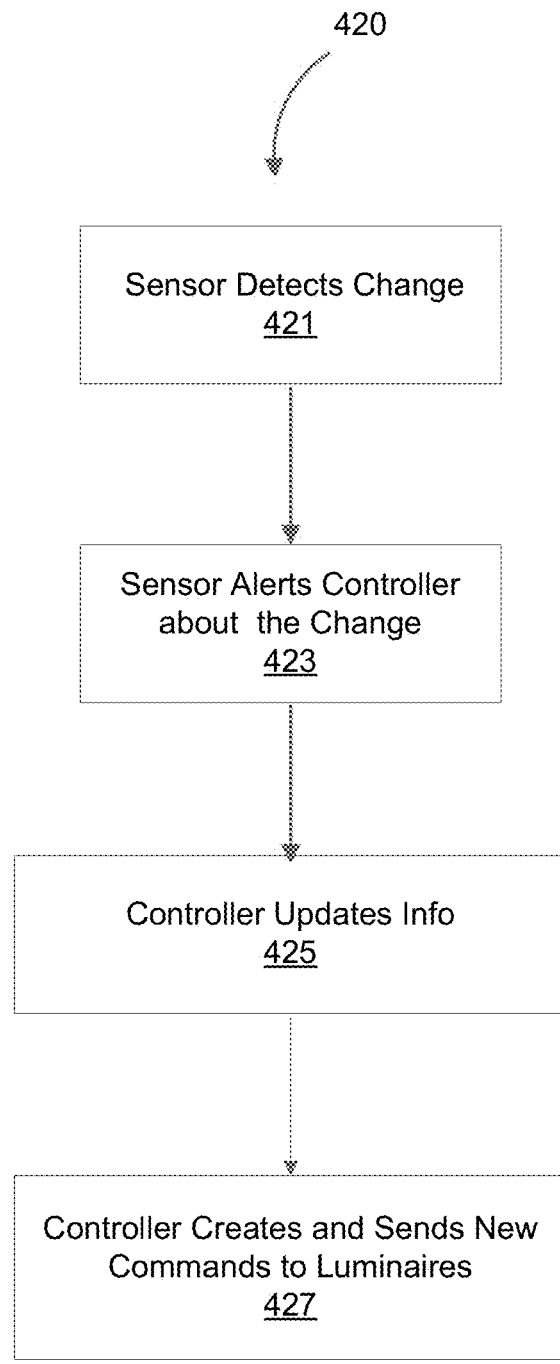
FIG. 4C illustrates a change triggered discovery/reading flow chart according to some embodiments of the invention.

In some other embodiments, controller 210 updates its information based on a change alert, for example, sent by a sensor. FIG. 4C illustrates such a change triggered discovery/reading flow chart 420, performed by illumination controller 210, according to some embodiments of the invention. In step 421, a sensor 231 or a device 251 associated with the sensor, detects a change in the stimulus. For example, an occupancy sensor whose reading has been "Not Occupied," can detect that a user is present in the workspace associated with the sensor, which can occur, for example, when a user arrives in the previously non-occupied workspace. Alternatively, a photosensor can detect that the intensity or spectral power distribution of light in its associated workspace has changed, which can occur, for example, because the workspace is located near a window and the intensity of the ambient light from the window has changed. Alternatively, an orientation sensor can detect that the orientation of its associated display has changed, which can occur, for example, if the user turns the mobile device associated with the sensor.

In step 423, sensor 231 sends an alert to controller 210, informing the controller about the change. Controller 210 responds to the alert by updating its readings information in step 425 and by creating and sending new commands to the luminaires in step 427. In some embodiments, controller 210 performs step 425 by performing new readings as explained, for example, in relation to FIG. 4A. Alternatively, in some embodiments, sensor 231 includes information about the new readings in the alert it sends to controller 210, and controller 210 updates its reading information in step 425 by using the information included in the alert. In some embodiments, controller 210 performs step 427 by creating and sending new commands as explained, for example, in relation to FIG. 4A.

Figure 4D:
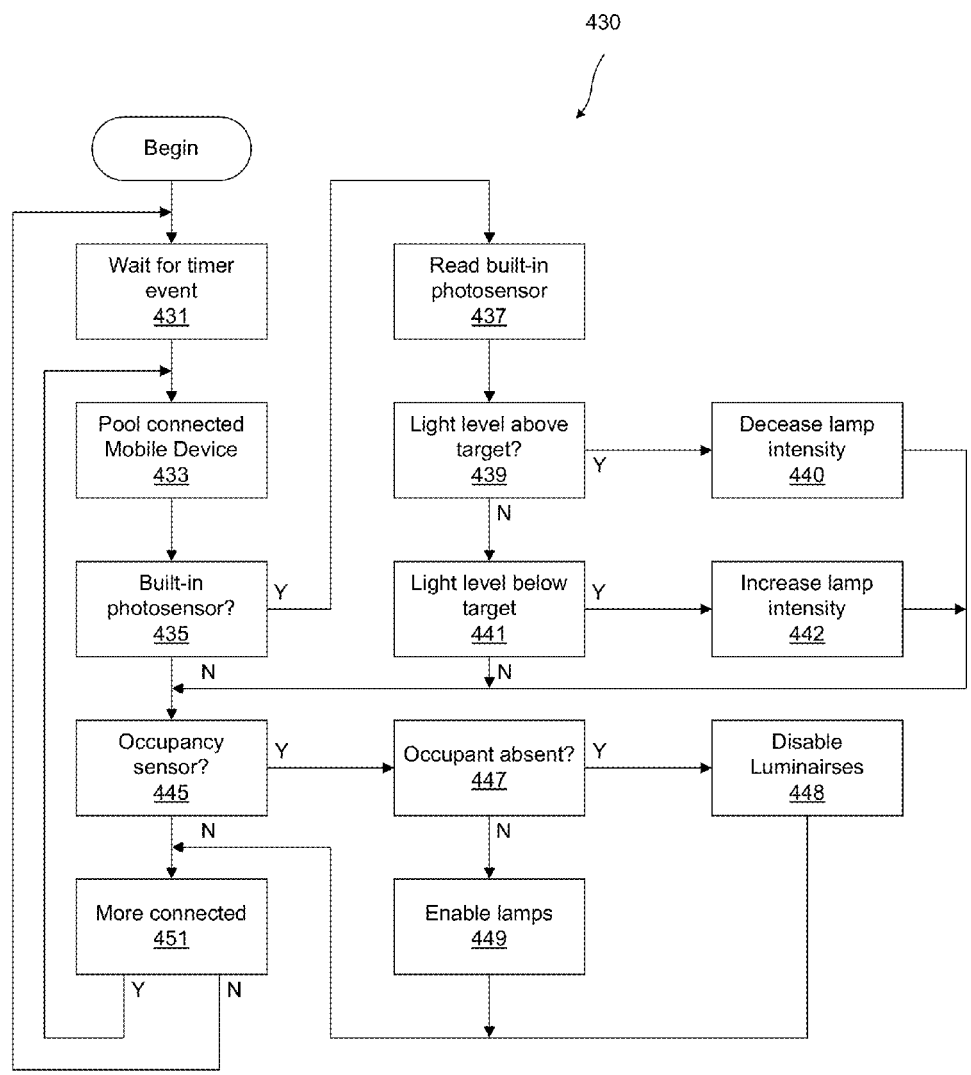
FIG. 4D shows a timer event triggered mobile device reading and command flow chart, in accordance with some embodiments of the invention.

FIG. 4D shows a flow chart 430 which illustrates a timer event triggered mobile device reading and command process, as performed by controller 210 in accordance with some embodiments of the invention. In step 431, controller 210 waits for a timer event. Once the timer event occurs, in step 433, controller 210 polls for and finds a mobile device 251 that is connected to communication network 220. In step 435, controller 210 determines whether mobile device 251 has a photosensor integrated with it, for example, as a built-in photosensor. If controller 210 determines that mobile device 251 does have a photosensor, controller 210 reads the photosensor in step 437. Controller 210 then compares this reading with a target, that is a user defined or preset default parameter defining the maximum desired level of illumination in the workspace associated with mobile device 251. If controller 210 determines that the reading is above the target as shown in step 439, controller 210 creates and sends a command to the luminaires illuminating that workspace to decrease their intensity, as shown in step 440. Alternatively, if controller 210 determines that the reading is below a second target, defining minimum desired level of illumination, as shown in step 441, controller 210 will create and send a command to the luminaires illuminating that workspace to increase their intensity, as shown in step 442.

In step 445, controller 210 determines whether mobile device 251 has an occupancy sensor integrated with it, for example, as a built-in occupancy sensor. If controller 210 determines that mobile device 251 does have an occupancy sensor, controller 210 reads the occupancy sensor. Using that reading, if controller 210 determines that the workspace associated with mobile device 251 is not occupied as shown in step 447, controller 210 will create and send a disable command to the luminaires illuminating that workspace to turn off their illumination, as shown in step 448. Alternatively, if controller 210 determines that the workspace is occupied, as also shown in step 447, controller 210 will create and send an enable command to the luminaires illuminating that workspace to turn on their illumination, as shown in step 449. In step 451, controller 210 determines whether there are any other mobile devices connected to communication network 220, and if so, it repeats the above process for each of those mobile devices. Controller 210 can perform one or more of the determinations and reading steps explained above by, for example, utilizing a user interface provided by the mobile device.

In some embodiments, controller 210 uses multiple readings from different sensors associated with the same workspace. In some embodiments, controller 210 utilizes these multiple readings to derive an average reading for the workspace. For instance, controller 210 can utilize readings from two or more photosensors associated with the workspace to determine the average level of illumination in that workspace. Alternatively, in some embodiments, controller 210 utilizes these multiple readings to detect and correct an error in the readings by a sensor. For instance, controller 210 can receive a "Not Occupied" reading from a first occupancy sensor associated with a workspace, and two "Occupied" readings from a second and a third occupancy sensor associated with the same workspace. Controller 210 can then determine that the workspace is occupied and disregard the reading of the first sensor. Controller 210 may decide that the first sensor's false reading is because the user in the workspace is not sufficiently close to the first sensor for it to detect the user's presence. Alternatively, controller 210 may decide that the first sensor's false reading is because that sensor is turned off, or is faulty.

Data discussed with respect to Tables can be arranged and stored in different ways. In some embodiments, some tables are implemented using relational databases. In some other embodiments, tables are implemented as plain files. In some embodiments, tables are stored in memory 113. In some other embodiments, tables are stored in other storage devices accessible to controller 210, for example, the storage devices of devices 251 or 252. Further, in some embodiments, two or more of the tables are combined into one table, or a table is divided into multiple tables. For example, Tables 1-3, can be combined into one table, showing information about luminaires, sensors, and their mapping; and tables 4 and 6 can be combined into one table, showing information about sensors installed on each device and their readings. Alternatively table 6, for example, can be divided into two tables, first one mapping each device to one or more sensors integrated with that device, and the second one showing sensor information as illustrated, for example, in Table 1.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An illumination controller for controlling illumination of a workspace near a display, the illumination controller comprising:
   a memory device storing a user's preference for illumination of the workspace;
   a processor accessing the user's preference in the memory device;
   an interface between the processor and an electronic sensor located proximate to the display, the interface collecting a reading from the electronic sensor;
   the processor operating to discover wirelessly the electronic sensor,
   discover at leas one luminaire in proximity to the electronic sensor and
   create a sensor-luminaire map which maps each electronic sensor with one or more luminaire;

wherein the processor compares the reading with the user's preference, and sends a command to the at least one luminaire to adjust the illumination of the workspace.

2. The illumination controller of claim 1, wherein the electronic sensor is a photosensor, an occupancy sensor, an orientation sensor, or a location sensor.

3. The illumination controller of claim 1, wherein the interface collects the reading from the electronic sensor via a wireless communication link.

4. The illumination controller of claim 1, wherein the interface identifies the electronic sensor before collecting the reading.

5. The illumination controller of claim 1, wherein the display is a display of a computer.

6. The illumination controller of claim 1, wherein the electronic sensor is attached to the display.

* * * * *